(12) United States Patent
Brockschneider et al.

(10) Patent No.: US 7,506,939 B2
(45) Date of Patent: Mar. 24, 2009

(54) VEHICLE SEAT

(75) Inventors: Dagmar Brockschneider, Rietberg (DE); Silvia Krömer, Pollhagen (DE); Benno Kauls, Warmsen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 363 days.

(21) Appl. No.: 11/377,335

(22) Filed: Mar. 17, 2006

(65) Prior Publication Data

US 2006/0237986 A1    Oct. 26, 2006

(30) Foreign Application Priority Data

Mar. 17, 2005  (DE)  ........................ 10 2005 012 320

(51) Int. Cl.
*A47C 7/02* (2006.01)
(52) U.S. Cl. .............. 297/452.6; 297/218.2; 297/218.3; 297/452.58
(58) Field of Classification Search .............. 297/218.2, 297/228.13, 452.61, 452.58
See application file for complete search history.

(56) References Cited

U.S. PATENT DOCUMENTS

| | | | |
|---|---|---|---|
| 1,853,579 A | | 4/1932 | Sallop |
| 3,794,378 A | * | 2/1974 | Haslam et al. ........... 297/452.6 |
| 4,057,292 A | * | 11/1977 | Arnold ................... 297/452.6 |
| 4,844,539 A | * | 7/1989 | Selbert .................. 297/228.13 |
| 5,601,332 A | | 2/1997 | Schultz et al. |
| 5,820,214 A | | 10/1998 | Bessette et al. |
| 5,911,369 A | * | 6/1999 | Yamazaki .................... 24/429 |
| 5,964,017 A | * | 10/1999 | Roberts ...................... 29/91.1 |
| 6,048,025 A | * | 4/2000 | Tillner .................... 297/218.1 |
| 6,283,552 B1 | | 9/2001 | Halse et al. |
| 6,964,453 B1 | * | 11/2005 | Flegal et al. ............. 297/452.6 |
| 7,128,371 B2 | * | 10/2006 | Kawasaki et al. ........ 297/284.2 |
| 7,255,405 B2 | * | 8/2007 | Kodera et al. .......... 297/452.62 |
| 2004/0055119 A1 | * | 3/2004 | Keyaki et al. ................. 24/427 |

FOREIGN PATENT DOCUMENTS

| | | |
|---|---|---|
| DE | 42 19 891 A1 | 12/1993 |
| DE | 195 10 789 A1 | 9/1996 |
| DE | 694 08 966 T2 | 7/1998 |

(Continued)

OTHER PUBLICATIONS

German Office Action dated Feb. 20, 2006 in German Application No. 10 2005 013 613.3-16, filed Mar. 24, 2005 (3 pages).

(Continued)

*Primary Examiner*—Laurie K Cranmer
(74) *Attorney, Agent, or Firm*—Shlesinger, Arkwright & Garvey LLP

(57) ABSTRACT

Vehicle seat includes a cushion body and an attached cover with a groove at the attachment sites in the cushion body, and first lockable attachment elements attached to a groove base that lock with second lockable attachment elements affixed to the cover. Vehicle seat includes attachment elements that enable the cover to be easily, quickly and properly attached to the cushion body. This is achieved in that the first and second lockable attachment elements are the halves of a slide lock or zipper lock with a slide received by the groove.

6 Claims, 4 Drawing Sheets

FOREIGN PATENT DOCUMENTS

| | | |
|---|---|---|
| DE | 197 34 408 A1 | 2/1999 |
| DE | 298 22 649 U1 | 5/1999 |
| DE | 199 49 423 C1 | 1/2001 |
| DE | 201 09 719 U1 | 9/2001 |
| DE | 100 34 088 A1 | 1/2002 |
| DE | 101 31 718 C1 | 1/2003 |
| EP | 0 103 679 | 3/1984 |
| EP | 252783 A2 * | 1/1988 |
| EP | 0 649 619 A1 | 4/1995 |
| EP | 1 577 157 A2 | 9/2005 |
| WO | 99/05001 | 2/1999 |

OTHER PUBLICATIONS

German Office Action dated Feb. 17, 2006 in German Application No. 10 2005 012 320.1-16, filed Mar. 17, 2005 (3 pages).

* cited by examiner

VEHICLE SEAT

CROSS-REFERENCE TO RELATED APPLICATION

This application claims priority of German application no. 10 2005 012 320.1, filed Mar. 17, 2005, and which is incorporated herein by reference.

FIELD OF THE INVENTION

The present invention relates to a vehicle seat with a cushion body and an attachable covering. More particularly, the invention relates to a vehicle seat with a cushion body and an attachable cover with a groove at attachment sites in the cushion body, first lockable attachment elements attached to the groove base that lock with second lockable attachment elements affixed to the cover. Even more particularly, the invention relates to a vehicle seat with a cushion body and an attachable cover, in which such first and second lockable attachment elements are respective halves of a slide lock or zipper lock with a slide received by the groove.

BACKGROUND OF THE INVENTION

Vehicle seats of this kind are, for example, known from DE 42 19 891 A1, DE 197 34 408 A1, DE 298 22 649 and EP 649619 A1. The first and second attachment elements are designed as shaped strips or individual pieces with complementary profiles, or a combination of both. The attachment elements are locked and the cover is attached to the cushion body when the complementary profiles of the attachment elements are pressed into each other and barb each other. Since the attachment sites are partially or completely covered by the cover during this process, i.e. visibility is poor during this process, individual attachment sites may not lock.

OBJECTS AND SUMMARY OF THE INVENTION

An object of the invention is to offer attachment elements for a vehicle seat of this type that enable the cover to be easily, quickly and properly attached to the cushion body.

This object is achieved according to the invention with a vehicle seat with the features of a cushion body and an attachable cover with a groove at attachment sites in the cushion body, first lockable attachment elements attached to the groove base that lock with second lockable attachment elements affixed to the cover, and in which such first and second lockable attachment elements are respective halves of a slide lock or zipper lock with a slide received by the groove.

By pulling on the slide, the slide lock seal or zipper lock is successively closed which ensures that there are no missed places when connecting. This is a more or less seamless attachment of numerous sites that introduce and deflect force where the subsequent site cannot be closed if the prior site has not been closed beforehand. The flexibility of sliding locks or zipper locks in the closing plane simultaneously ensures a firm attachment with small radii.

Additional advantageous embodiments of the invention are set forth herein.

The invention will be further explained below with reference to an exemplary embodiment.

Relative terms such as left, right, up, and down are for convenience only and are not intended to be limiting.

The associated drawings show the following:

DETAILED DESCRIPTION OF THE INVENTION

Figure 1:
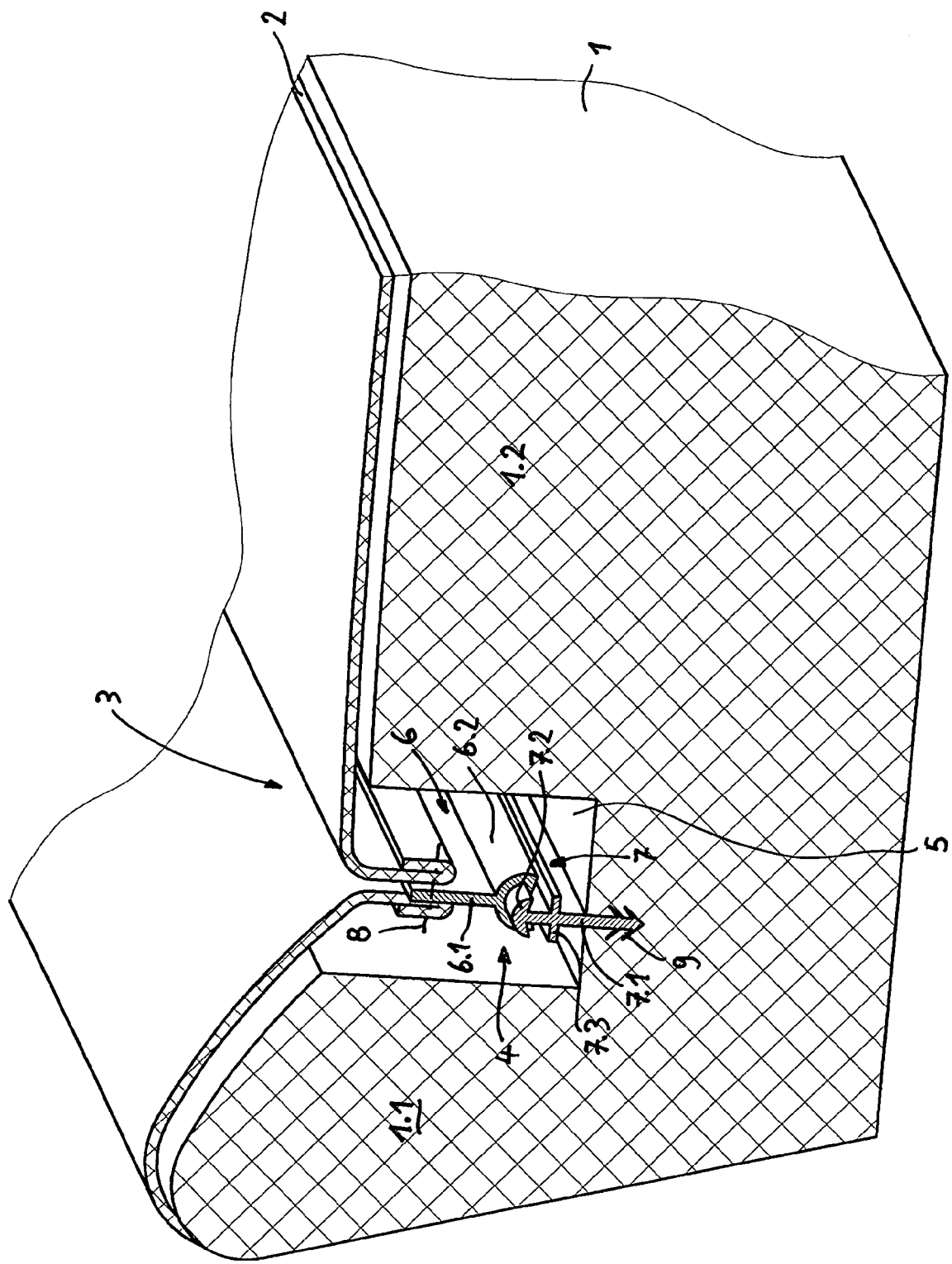
FIG. 1 is a perspective view of a section of a connection created using a slide seal between a cover and cushion body.
Figure 2:
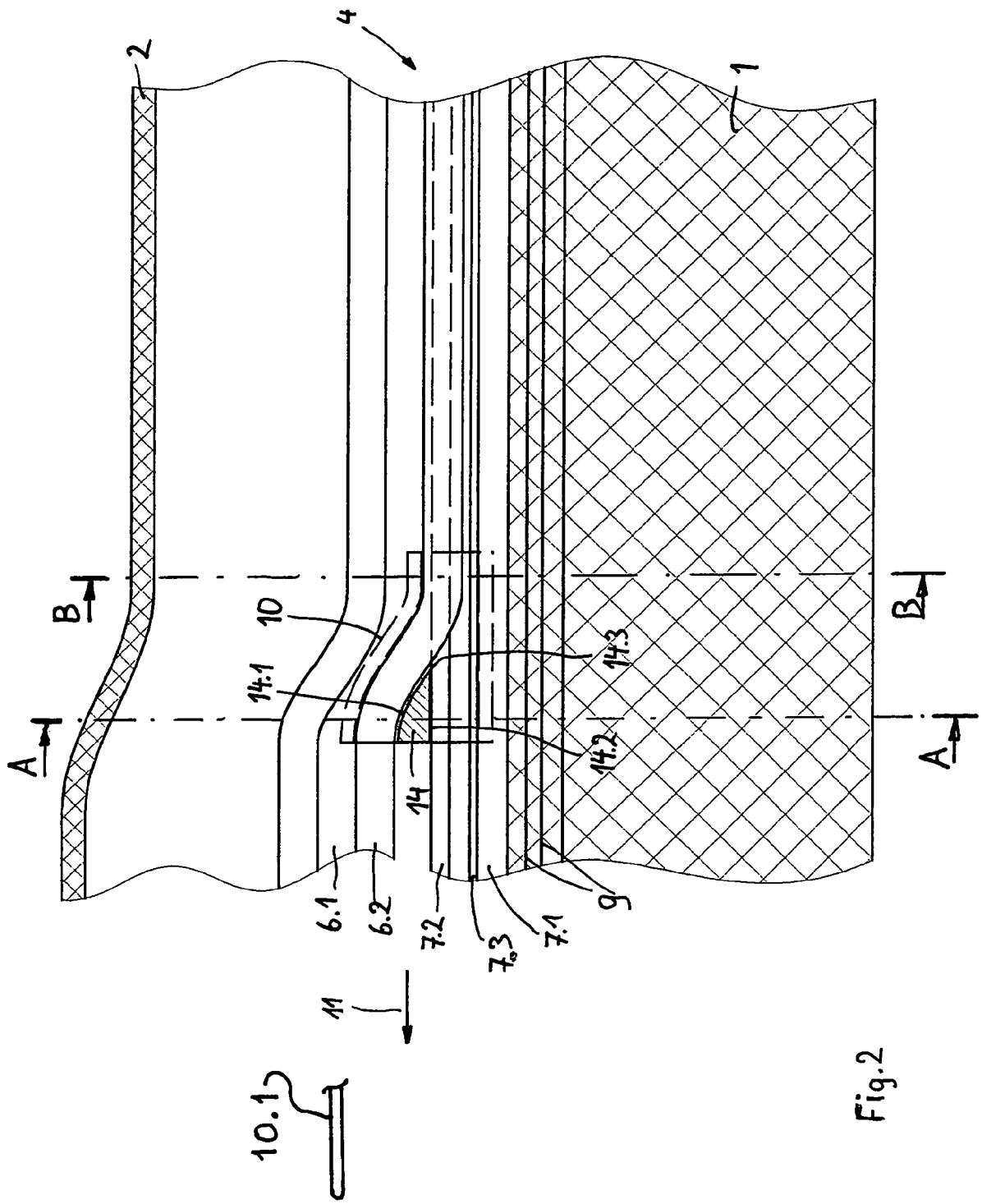
FIG. 2 is a lengthwise section of an attachment site in an intermediate stage while creating the attachment.
Figure 3:
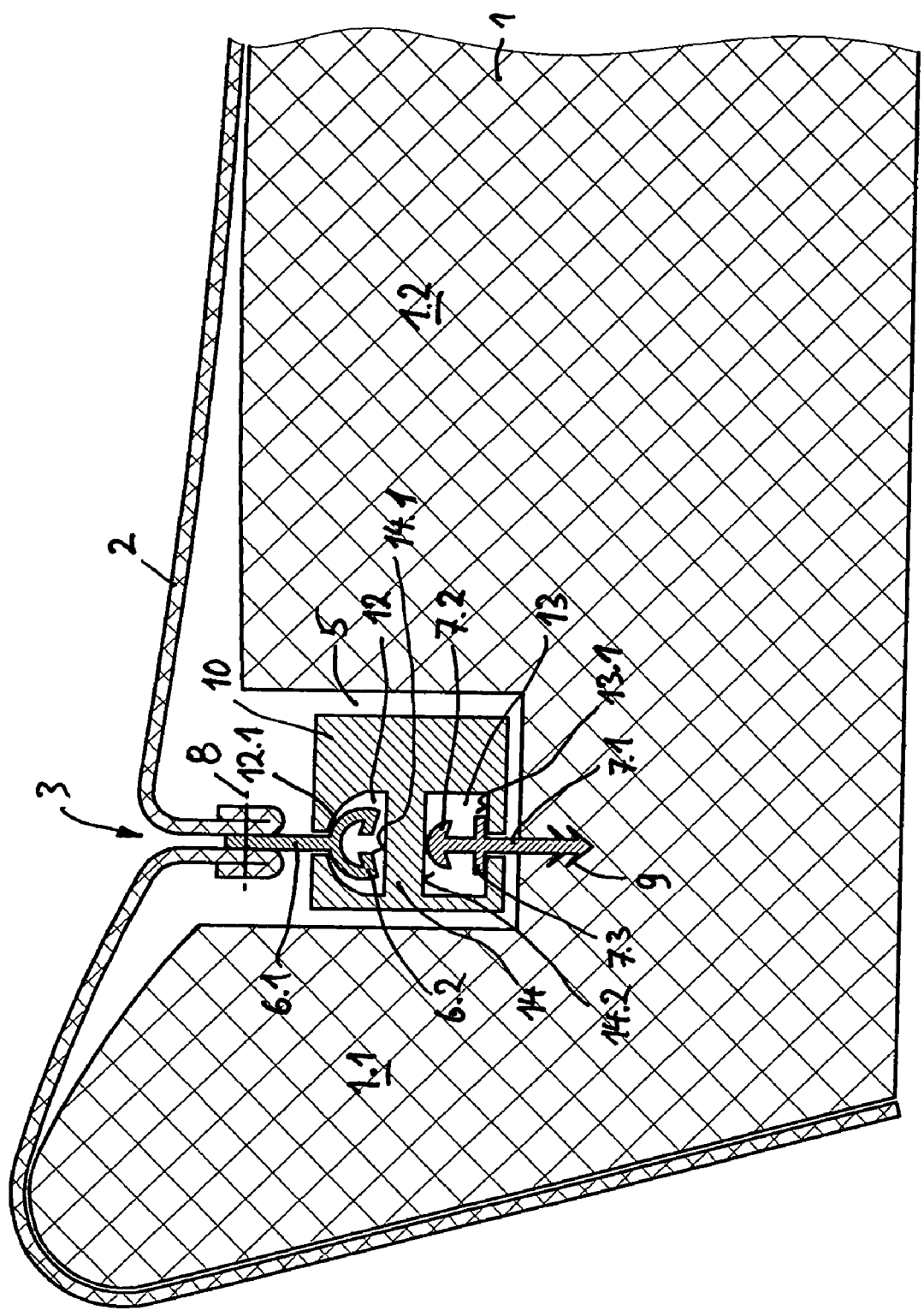
FIG. 3 is a sectional view taken along line A-A of FIG. 2.
Figure 4:
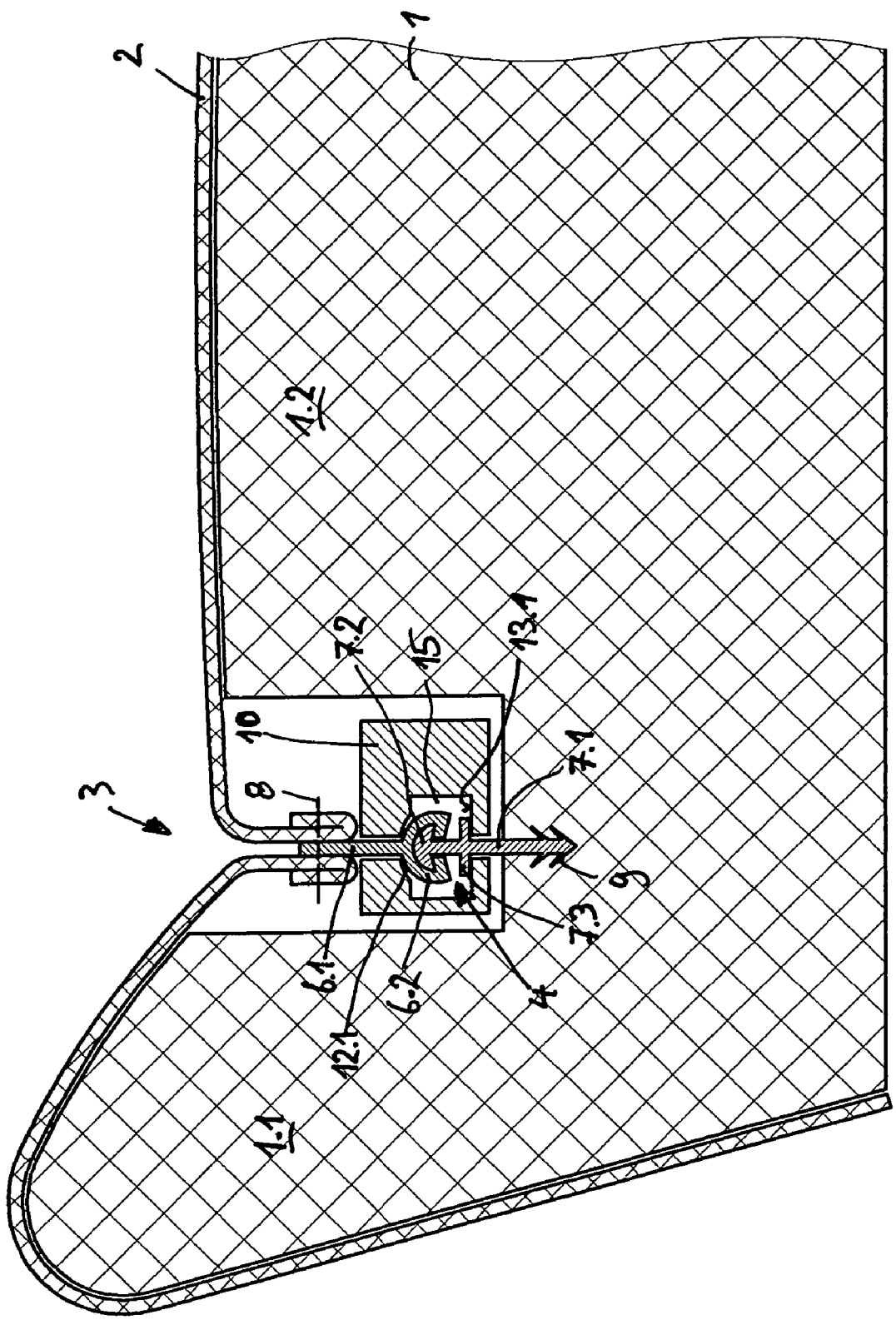
FIG. 4 is a sectional view taken along line B-B of FIG. 2.

FIGS. 1-4 show a section of a cushion body 1 made of plastic foam such as polyurethane of an embodiment of the invention. This cushion body 1 can be the cushion of a seat part, or a backrest of a vehicle seat. Region 1.1 of the cushion body 1 forms a side bead, and region 1.2 forms a leaning or sitting surface for the seat. The cushion body 1 is covered with a cover 2 facing toward the outside, i.e. on its surface facing a seated passenger. The connection sites 3 are provided to create the connection between the cover 2 and cushion body 1.

The cover 2 is connected to a cushion body 1 with slide locks 4. Attachment channels in the form of grooves 5 are provided at the attachment sites 3 in the cushion body 1, and the grooves receive the slide locks 4.

Each slide lock 4 includes a first half 6 and a second half 7. Each half 6, 7 possesses a bar 6.1 and 7.1 whose ends are attached to complementary male/female locking bodies 6.2 and 7.2. On the ends facing away from the locking bodies 6.2 and 7.2, halves 6.7 are tightly connected via a seam 8 to the cover 2 or tightly foamed into the cushion body 1. To increase the tensile strength, the foamed-in ends of the bar 7.1 are provided with barbs 9.

To close the slide lock 4, a slide 10 is provided that, like the entire slide lock 4, is in the groove 5. It possesses two channels 12, 13 that are open in the direction of closing (arrow 11, FIG. 2). Upper channel 12 receives locking body 6.2, and lower channel 13 receives locking body 7.2. Channels 12, 13 are first separated from each other by a wedge 14 viewed from the open side of the slide lock 4, and the upper wall 12.1 of channel 12 abuts the upper face of locking body 6.2, whereas the lower wall 13.1 of channel 13 abuts the bottom of a flange 7.3 at a distance from locking body 7.2. The upper wall 12.1 converges counter to the direction of closing (arrow 11) towards the bottom wall 13.1, and an upper surface 14.1 of the wedge 14 converges to its lower face 14.2, and they run together at an edge. After this edge 14.3, the channels 12 and 13 transition into each other to form a single channel 15.

To close the slide lock 4, the slide 10 is pulled toward the arrow 11. The locking bodies of 6.2, 7.2 run in the upper channel 12 and bottom channel 13, respectively, and are separated by the wedge 14. Given the converging configuration of the channels 12 and 13, locking body 6.2 is successively pulled downward to locking body 7.2 as slide 10 moves in the direction of closing 11, and the locking bodies finally lock. This closing movement simultaneously pulls on the cover 2 so that it is tightened on the cushion body 1. Locking bodies 6.2 and 7.2 possess barb-like undercuts which tighten the connection and resist the forces resulting from the using the seat.

To make assembly easier, it is useful to provide a pull cord 10.1 attached to the slide that can pull the slide 10 in the direction of closing 11. After attachment, pull cord 10.1 can either be removed or left in the groove 5.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Vehicle seat, comprising:
   a) a cushion body and an attached cover having respective attachment sites;
   b) a groove having a groove base at the respective attachment sites in the cushion body:
   c) first lockable attachment elements being attached to the groove base, the first lockable attachment elements being lockable with second lockable attachment elements affixed to the cover; and
   d) the first and second lockable attachment elements being respective halves of one of a slide lock and zipper lock with a slide received by the groove.

2. Vehicle seat according to claim 1, wherein:
   a) a pull cord is attached to the slide.

3. Vehicle seat according to claim 2, wherein:
   a) a half of the one of a slide lock and zipper lock is foamed into the cushion body and includes barbs at the foamed-in end.

4. Vehicle seat according to claim 3, wherein:
   a) another half of the one of a slide lock and zipper lock is sewn to the cover.

5. Vehicle seat according to claim 1, wherein:
   a) a half of the one of a slide lock and zipper lock is foamed into the cushion body and includes barbs at the foamed-in end.

6. Vehicle seat according to claim 5, wherein:
   a) another half of the one of a slide lock and zipper lock is sewn to the cover.

* * * * *